US011295326B2

(12) United States Patent
Cook et al.

(10) Patent No.: US 11,295,326 B2
(45) Date of Patent: Apr. 5, 2022

(54) INSIGHTS ON A DATA PLATFORM

(71) Applicant: American Express Travel Related Services Company, Inc., New York, NY (US)

(72) Inventors: Jane Cook, New York, NY (US); Michelle Geller, New York, NY (US); Yogaraj Jayaprakasam, Phoenix, AZ (US); Abhishek Kachhara, Phoenix, AZ (US); Sanjay Madaan, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1140 days.

(21) Appl. No.: 15/421,043

(22) Filed: Jan. 31, 2017

(65) Prior Publication Data
US 2018/0218384 A1 Aug. 2, 2018

(51) Int. Cl.
*G06Q 30/02* (2012.01)
*G06F 16/25* (2019.01)

(52) U.S. Cl.
CPC ....... *G06Q 30/0204* (2013.01); *G06F 16/252* (2019.01)

(58) Field of Classification Search
CPC .......................... G06Q 30/0204; G06F 16/252
See application file for complete search history.

(56) References Cited

U.S. PATENT DOCUMENTS

| 6,029,144 | A | * | 2/2000 | Barrett | G06Q 99/00 235/375 |
|---|---|---|---|---|---|
| 6,820,168 | B2 | | 11/2004 | Tanaka | |
| 8,090,402 | B1 | | 1/2012 | Fujisaki | |
| 8,572,679 | B1 | | 10/2013 | Wang | |
| 9,092,502 | B1 | | 7/2015 | Cannaliato | |
| 9,176,966 | B2 | | 11/2015 | Silverstein | |
| 9,584,517 | B1 | | 2/2017 | Branchek | |
| 9,785,953 | B2 | | 10/2017 | Desal | |

(Continued)

OTHER PUBLICATIONS

"MR-DBSCAN: a scalable MapReduce-based DBSCAN algorithm for heavily skewed data", Y He, H Tan, W Luo, S Feng, J Fan—Frontiers of Computer Science, 2014—Springer (Year: 2014).*

(Continued)

*Primary Examiner* — Jonathan G Sterrett
(74) *Attorney, Agent, or Firm* — Thomas | Horstemeyer, LLP

(57) ABSTRACT

A system, method, and computer readable medium (collectively, the "system") is disclosed for generating real-time insights from a big data storage platform. The system may process transaction data stored in a big data management system (BDMS) to generate characteristic data associated with a plurality of demographics. The system may also model an account associated with a corporate ID to identify a demographic from the plurality of demographics associated with the corporate ID. The system may further compare the user data associated with the corporate ID to the characteristic data of the demographic associated with the corporate ID to generate a view responsive to a request. The system may also transmit the view in response to the request, for example, to an interface for use by a program administrator.

20 Claims, 10 Drawing Sheets

(56) References Cited

U.S. PATENT DOCUMENTS

| | | | |
|---|---|---|---|
| 10,129,118 B1* | 11/2018 | Ghare | H04L 43/028 |
| 2002/0023215 A1 | 2/2002 | Wang | |
| 2003/0028529 A1 | 2/2003 | Cheung | |
| 2004/0028227 A1 | 2/2004 | Yu | |
| 2005/0027723 A1 | 2/2005 | Jones | |
| 2005/0049924 A1 | 3/2005 | DeBettencourt | |
| 2005/0144451 A1 | 6/2005 | Voice | |
| 2005/0149761 A1 | 7/2005 | Chiviendacz | |
| 2006/0085408 A1* | 4/2006 | Morsa | G06Q 30/0275 |
| 2006/0136570 A1 | 6/2006 | Pandya | |
| 2006/0195449 A1 | 8/2006 | Hunter | |
| 2006/0282864 A1 | 12/2006 | Gupte | |
| 2006/0294354 A1 | 12/2006 | McCall | |
| 2007/0005648 A1 | 1/2007 | Armanino | |
| 2007/0005967 A1 | 1/2007 | Mister | |
| 2007/0045403 A1 | 3/2007 | Slonecker, Jr. | |
| 2007/0064598 A1 | 3/2007 | Nooner | |
| 2007/0157016 A1 | 7/2007 | Dayan | |
| 2008/0228540 A1* | 9/2008 | Megdal | G06Q 40/08 705/7.33 |
| 2008/0229352 A1 | 9/2008 | Pino | |
| 2008/0256253 A1 | 10/2008 | Branson | |
| 2008/0275951 A1 | 11/2008 | Hind | |
| 2009/0013194 A1 | 1/2009 | Abbas | |
| 2009/0113110 A1 | 4/2009 | Chen | |
| 2009/0136121 A1 | 5/2009 | Nakagaki | |
| 2009/0204613 A1 | 8/2009 | Muroi | |
| 2009/0254463 A1 | 10/2009 | Tomchek | |
| 2010/0082384 A1* | 4/2010 | Bohrer | G06Q 30/0201 705/7.29 |
| 2010/0088338 A1 | 4/2010 | Pavoni, Jr. | |
| 2010/0198769 A1 | 8/2010 | Gould | |
| 2012/0066107 A1 | 3/2012 | Grajetzki | |
| 2012/0079537 A1 | 3/2012 | Kalidinidi | |
| 2012/0089562 A1 | 4/2012 | Deremigio | |
| 2012/0185925 A1 | 7/2012 | Barkie | |
| 2012/0215684 A1 | 8/2012 | Kidron | |
| 2013/0080214 A1* | 3/2013 | Webb | G06Q 30/0204 705/7.39 |
| 2013/0096988 A1* | 4/2013 | Grossman | G06Q 30/04 705/7.34 |
| 2013/0124413 A1 | 5/2013 | Itwaru | |
| 2013/0187926 A1 | 7/2013 | Silverstein | |
| 2013/0218769 A1 | 8/2013 | Pourfallah | |
| 2014/0046842 A1 | 2/2014 | Irudayam | |
| 2014/0165133 A1 | 6/2014 | Foley | |
| 2015/0006279 A1* | 1/2015 | Khann | G06Q 30/0246 705/14.45 |
| 2015/0026462 A1 | 1/2015 | Ramesh et al. | |
| 2015/0127516 A1 | 5/2015 | Studnitzer | |
| 2015/0150023 A1 | 5/2015 | Johnson | |
| 2015/0161301 A1 | 6/2015 | Nagabhushana | |
| 2015/0178532 A1 | 6/2015 | Brule | |
| 2015/0193243 A1 | 7/2015 | Varkhedi | |
| 2015/0193638 A1 | 7/2015 | Cook | |
| 2015/0227931 A1 | 8/2015 | Genovez | |
| 2015/0261881 A1 | 9/2015 | Wensel | |
| 2015/0261948 A1 | 9/2015 | Marra | |
| 2015/0370232 A1 | 12/2015 | Kohn | |
| 2015/0371240 A1* | 12/2015 | Meyer | G06Q 30/0201 705/7.33 |
| 2016/0014148 A1 | 1/2016 | Lee | |
| 2016/0020297 A1 | 1/2016 | Kuang | |
| 2016/0070971 A1 | 3/2016 | Nakashima | |
| 2016/0080493 A1 | 3/2016 | Roth | |
| 2016/0088566 A1 | 3/2016 | Stephens | |
| 2016/0092557 A1 | 3/2016 | Stojanov | |
| 2016/0143594 A1* | 5/2016 | Moorman | A61B 5/02405 705/2 |
| 2016/0189119 A1 | 6/2016 | Bowman | |
| 2016/0203478 A1 | 7/2016 | Gardiner | |
| 2016/0232566 A1* | 8/2016 | Bonalle | G06Q 20/389 |
| 2016/0314403 A1 | 10/2016 | Chakraborty | |
| 2017/0017708 A1 | 1/2017 | Fuchs | |
| 2017/0085445 A1 | 3/2017 | Layman | |
| 2017/0091847 A1 | 3/2017 | Cama | |
| 2017/0154067 A1 | 6/2017 | Hazlewood | |
| 2017/0169068 A1 | 6/2017 | Kennedy, Jr. | |
| 2017/0295062 A1 | 10/2017 | Tang | |
| 2017/0364584 A1 | 12/2017 | Ginter | |

OTHER PUBLICATIONS

On optimizing replica migration in distributed cloud storage systems A Mseddi, MA Salahuddin, MF Zhani . . .—2015 IEEE 4th . . . , 2015—ieeexplore.ieee.org (Year: 2015).*

Improving mapreduce performance through data placement in heterogeneous hadoop clusters J Xie, S Yin, X Ruan, Z Ding, Y Tian . . .—. . . on Parallel & . . . , 2010—ieeexplore.ieee.org (Year: 2010).*

MapReduce: Simplified data processing on large clusters J Dean, S Ghemawat—2004—static.usenix.org (Year: 2004).* https://en.wikipedia.org/wiki/Multi-core_processor retrieved from web.archive.org Feb. 19, 2015. (Year: 2015).*

Hive-a petabyte scale data warehouse using hadoop A Thusoo, JS Sarma, N Jain, Z Shao . . .—2010 IEEE 26th . . . , 2010—ieeexplore.ieee.org (Year: 2010).*

HCatalog UsingHCat, 2014, retrieved from the web at: http://web.archive.org/web/20140809022120/https://cwiki.apache.org/confluence/display/Hive/HCatalog+UsingHCat (Year: 2014).*

Special Issue on Query Optimization for Big Data Systems, IEEE, 2013, pp. 1-68 (Year: 2013).*

"Combatting: Purchasing Card: and T&E Expense Fraud", CA John Verver, C CMC, PS Vice President . . .—qtxasset.com, 2014 (Year: 2014).*

Hadoop ecosystem: An introduction S Mehta, V Mehta—International Journal of Science and . . . , 2016—pdfs.semanticscholar.org (Year: 2016).*

"Statistical model selection with "Big Data"" JA Doornik, DF Hendry—Cogent Economics & Finance, 2015—Taylor & Francis (Year: 2015).*

Non-Final Office Action dated Sep. 21, 2017 in U.S. Appl. No. 14/945,032.

Non-Final Office Action dated Dec. 28, 2017 in U.S. Appl. No. 14/944,849.

Non-Final Office Action dated Feb. 7, 2018 in U.S. Appl. No. 14/972,314.

Non-Final Office Action dated Feb. 14, 2018 in U.S. Appl. No. 14/944,902.

Non-Final Office Action dated Feb. 23, 2018 in U.S. Appl. No. 14/944,898.

Non-Final Office Action dated Apr. 5, 2018 in U.S. Appl. No. 14/944,979.

Final office Action dated Apr. 18, 2018 in U.S. Appl. No. 14/945,032.

Final office Action dated May 30, 2018 in U.S. Appl. No. 14/944,898.

Non-final Office Action dated Jun. 7, 2018 U.S. Appl. No. 14/994,311.

Non-Final Office Action dated Jun. 12, 2018 in U.S. Appl. No. 15/897,747.

Advisory Action dated Jun. 27, 2018 in U.S. Appl. No. 14/945,032.

Notice of Allowance dated Jun. 29, 2018 in U.S. Appl. No. 14/971,314.

Non-Final Office Action dated Aug. 3, 2018 in U.S. Appl. No. 14/944,898.

Non-Final Office Action dated Aug. 7, 2018 in U.S. Appl. No. 14/945,032.

Non-Final Office Action dated Nov. 28, 2018 in U.S. Appl. No. 15/383,645.

Final Office Action dated Feb. 21, 2019 in U.S. Appl. No. 14/944,898.

* cited by examiner

FIG. 5

INSIGHTS ON A DATA PLATFORM

FIELD

This disclosure relates to systems and methods for generating insights on a big data platform.

BACKGROUND

Large data sets may vary according to size and organization. With big data comprising data sets as large as ever, the volume of data collected incident to the increased popularity of online and electronic transactions continues to grow. Billions of rows and hundreds of thousands of columns worth of data may populate a single table, for example. Different users may desire to access different portions of the large volume of data populating the table. However, making sense of such massive data sets can trouble users that are not well versed in big data technologies.

Access to data stored in big data systems typically involves writing queries or mapping data into the desired output sets. The results are generally viewable as large tables. The layperson struggles to decipher the vast wealth of data into meaningful insight. Moreover, individuals may not have access to the vast data sets stored by big data systems. For example, financial institutions may restrict access to sensitive, closed-loop data. These difficulties arising from access control and technical savvy further restrict average users from gleaning meaningful insight from big data sets. Instead, the average user and the user without direct access might rely on reports generated over the course of weeks. Such reports contain insights based on old and often inaccurate data by the time they reach users.

Individuals and companies are both interested in how they perform relative to their peers. However, individuals and companies lack the comprehensive tools to put together comparative insights. In addition to the difficulties incident to big data sets, sensitive information for peer groups is largely unavailable to such individuals and companies. Even if these entities could process big data sets in a meaningful way, financial data and transactional data is typically not publicly available. Rather, it is typically preserved in secrecy due to its sensitive nature. As a result, corporate administrators for example, lack access to actionable insights relating employee actions to corporate spending patterns.

SUMMARY

A system, method, and computer readable medium (collectively, the "system") is disclosed for generating real-time insights from a big data storage platform. The system may process transaction data stored in a big data management system (BDMS) to generate characteristic data associated with a plurality of demographics. The system may also model an account associated with a corporate ID to identify a demographic from the plurality of demographics associated with the corporate ID. The system may further compare the user data associated with the corporate ID to the characteristic data of the demographic associated with the corporate ID to generate a view responsive to a request. The system may also transmit the view in response to the request, for example, to an interface for use by a program administrator.

In various embodiments, the system may store the user data associated with the corporate ID in a partition of the distributed computing cluster. The distributed computing cluster may comprise at least 512 partitions and at least 8 nodes. The system may also perform operations such as receiving a data stream from the BDMS, and processing the data stream from the BDMS to update the view in real time. The system may identify a transaction as an out-of-pattern transaction in response to the comparing the user data associated with the corporate ID to the characteristic data of the demographic associated with the corporate ID. The system may also flag the out-of-pattern transaction as a false positive in response to a selection in an interface displaying the view. The system may further be configured for storing the view in a big data storage format suitable for rapid retrieval and processing.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 5 illustrates a navigation interface for accessing insight categories available to a user account, in accordance with various embodiments;

DETAILED DESCRIPTION

Figure 1:
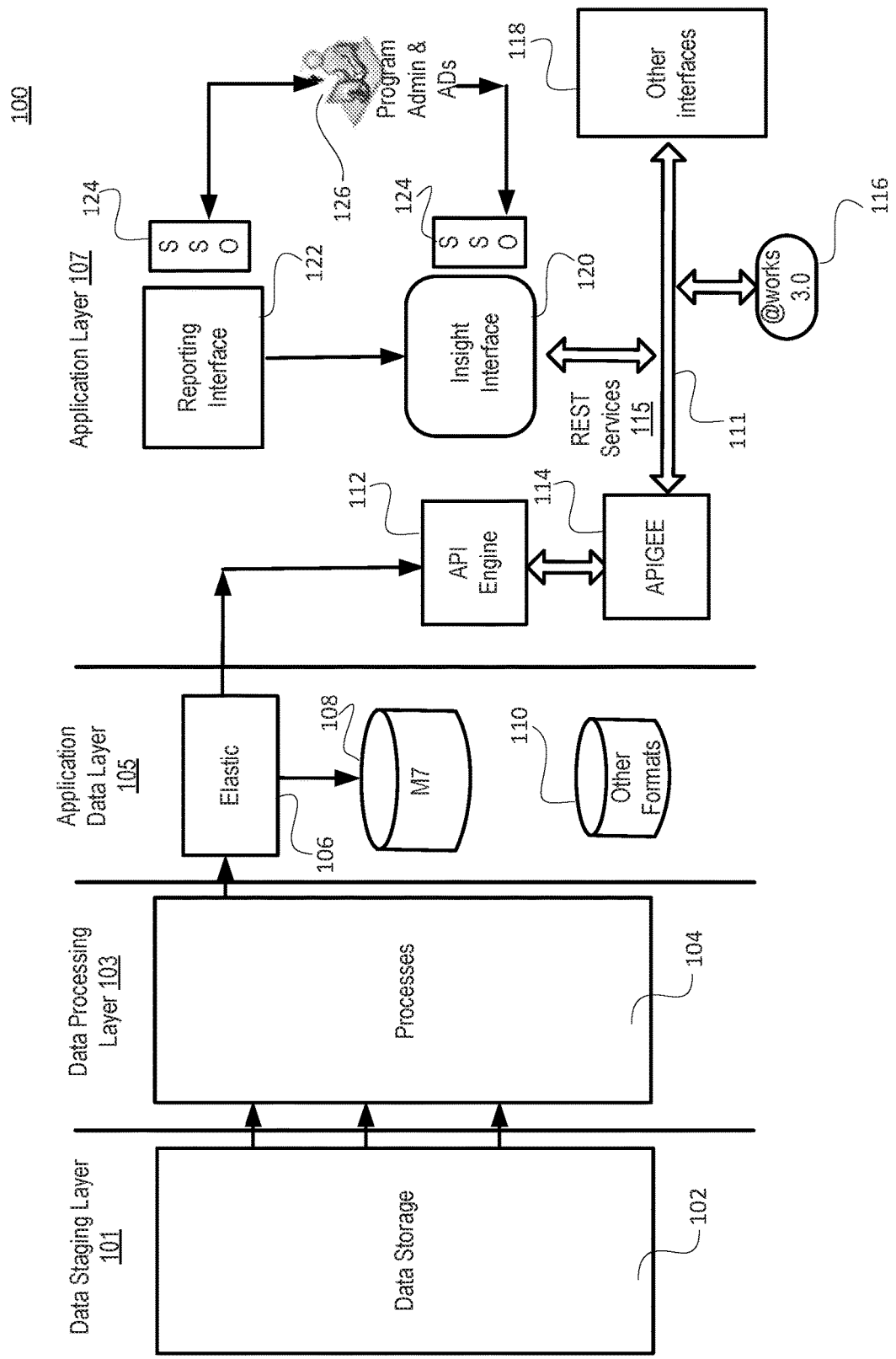
FIG. 1 illustrates an exemplary system for generating and delivering insights using big data infrastructure, in accordance with various embodiments.

The detailed description of various embodiments herein refers to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big-data storage formats containing millions of records (i.e., rows) and numerous variables (i.e., columns) for each record.

Phrases and terms similar to "internal data" and "PII" may include any identifying or sensitive data related to an individual. For example, data that a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Direct access to internal data may be restricted by systems of the present disclosure, although access to rolled up data based on market segments may be leveraged to generate actionable insights.

The present disclosure provides systems, methods, and computer program products for generating actionable insight on a big data platform and enabling actions in response to the generated insights. The system may provide access to the insights via representational state transfer (REST) services accessible to end users by way of a thin client (e.g., web app) or a native application running on one or more computing devices. These insights may be unattainable by typical data storage systems as they are generated in part using internal data available on a large scale to financial institutions. The internal data may be combined with data from external sources to drive a big data analytics engine that generates insights into suppliers, people, transactions, policies, rewards, or other areas of corporate interest.

Referring now to FIG. 1, a system 100 is shown for generating and delivering insights using, big data systems, in accordance with various embodiments. System 100 may comprise various layers including data staging layer 101, data processing layer 103, application data layer 105, and application layer 107. System 100 may stage data in data storage 102 of data staging layer 101. Data storage 102 may comprise a distributed file system or a big data management system (e.g., described below in FIGS. 3A and 3B). Data processing 103 may execute various processes 104 on the data stored in data storage 102 and thereby apply predetermined transformations to the retrieved data.

The result of processes 104 may be stored in tables, files, databases, or other data storage formats in an application data layer 105. Application data layer 105 may comprise storage tables in the form of elastic search tables 106, M7 tables 108, and/or other formats 110. Other formats may include, for example, DB2, relational databases, and/or big data storage formats. Although these data storage formats are used as examples of data storage, other data storage systems and formats may also be suitable to support the insight framework described herein. The technologies implemented in application data layer 105 may be selected for performance purposes, and may be updated incrementally and/or using batch processing. The application data layer 105 may also be updated at various intervals (e.g., hourly, every 3 hours, every 6 hours, every 12 hours, daily, etc.) and/or in real-time in response to updates in data storage 102. Updates may be performed by retrieving data from data staging layer 101, processing the data in data processing layer 103, and storing the data in an accessible manner in application data layer 105.

The application data layer 105 may be implemented on the same hardware as data staging layer 101, or on separate computing devices, and configured to support user applications of application layer 107. For example, elastic search tables 106 may be used for data storage with a predetermined number of partitions or shards spread across and/or mirrored on a plurality of computing nodes. Computing nodes may comprise a server, computer, or any other computing device described herein. A plurality of nodes may form a distributed computing cluster similar to those described in, for example, FIGS. 3A and 3B below. Application layer 107 may operate on personal computing devices such as computers, laptops, tables, smartphones, smart devices, or other devices enabling program administrator 126 to communicate over an electronic network.

Continuing the above example, elastic search tables 106 may be distributed across at least 512 partitions and at least 8 computing nodes. The data may be indexed and/or stored in groups based on a key. For example, a corporate ID number may be a suitable key for grouping data on the various partitions. Data access in application data layer 105 may be accelerated by knowing which of the various partitions the data associated with the key is stored. The application data layer 105 may access the correct node(s) with minimal searching based on the key.

In various embodiments, the number of partitions and computing nodes of application data layer 105 may be selected based on end-user performance needs. Performance may be scaled vertically by adding more random access memory (ROM) to the computing nodes. Performance may also be scaled horizontally by adding additional computing nodes. In that regard, application data layer 105 may be scalable in response to the load demands of supported applications.

The application data layer 105 may be accessible by an API engine 112 and/or API platform 114. API platform 114 may comprise, for example, the API products available from APIGEE®. API platform 114 and API engine 112 may have overlapping functionality and may operate individually or in concert to receive and respond to API requests. One of API platform 114 and/or API engine 112 may be removed from system 100 with minimal loss of functionality. API platform 114 and/or API engine 112 may receive JSON requests from various applications and return JSON results responsive to the requests. Although JSON is identified as an exemplary data structure, other structured data types may be used.

The API engine 112 may read and/or write data in the application data store response to receiving API requests from various REST services 115 via a network 111. For example, REST services 115 may support website services 116, an insight interface 120, and/or other interfaces 118 that submit API requests to API platform 114 and/or API engine 112 via network 111.

The API requests may be processed into queries by an application server (e.g., a JBOSS server) running API engine 112 and/or API platform 114 for interfacing with data from application data layer 105. The API calls may retrieve and/or compile insights from application data layer 105 suitable for display and consumption by a program administrator 126. Program administrator 126 may operate using a computing device such as a laptop, personal computer, smart device, smartphone, or other electronic device in communication with a single sign on (SSO) 124 authentication process to access an insight interface 120 and/or a reporting interface 122. The program administrator 126 may be, for example, an HR professional overseeing individual transaction accounts associated with a corporate entity. Each corporate entity may be identified by a corporate ID associated with their corporate accounts. In that regard, program administrator 126 can access in real-time the views described herein associated with their corporate ID.

System 100 may include various devices, modules and applications in communication via a network 111. The various devices, modules and applications may include user devices, computing nodes, distributed computing systems, application servers, and/or other computing devices 108. Each computing device may include a computer or processor, or a set of computers/processors, such as a personal computer. Other types of computing units or systems may also be used, including laptops, notebooks, hand held computers, personal digital assistants, cellular phones, smart phones (e.g., iPhone®, BlackBerry®, Android®, etc.) tablets, wearables, Internet of Things (IoT) devices, or any other device capable of sending and/or receiving data over the network 111.

A network may be any suitable electronic link capable of carrying communication between two or more computing devices. For example, network 111 may be local area network using TCP/IP communication or wide area network incorporating communication over the Internet. Network 111 may also be an internal network isolated from the Internet.

Communication between the various communication devices may occur across unsecured networks such as the Internet. Communication over such networks may be carried out using a secure protocol such as the secure socket layer (SSL) protocol, for example. Communication over the network may utilize data encryption. Encryption may be performed by way of any of the techniques now available in the art or which may become available, such as Twofish, RSA, El Gamal, Schorr signature, DSA, PGP, PKI, GPG (GnuPG), and symmetric and asymmetric cryptography systems, for example.

Figure 2:
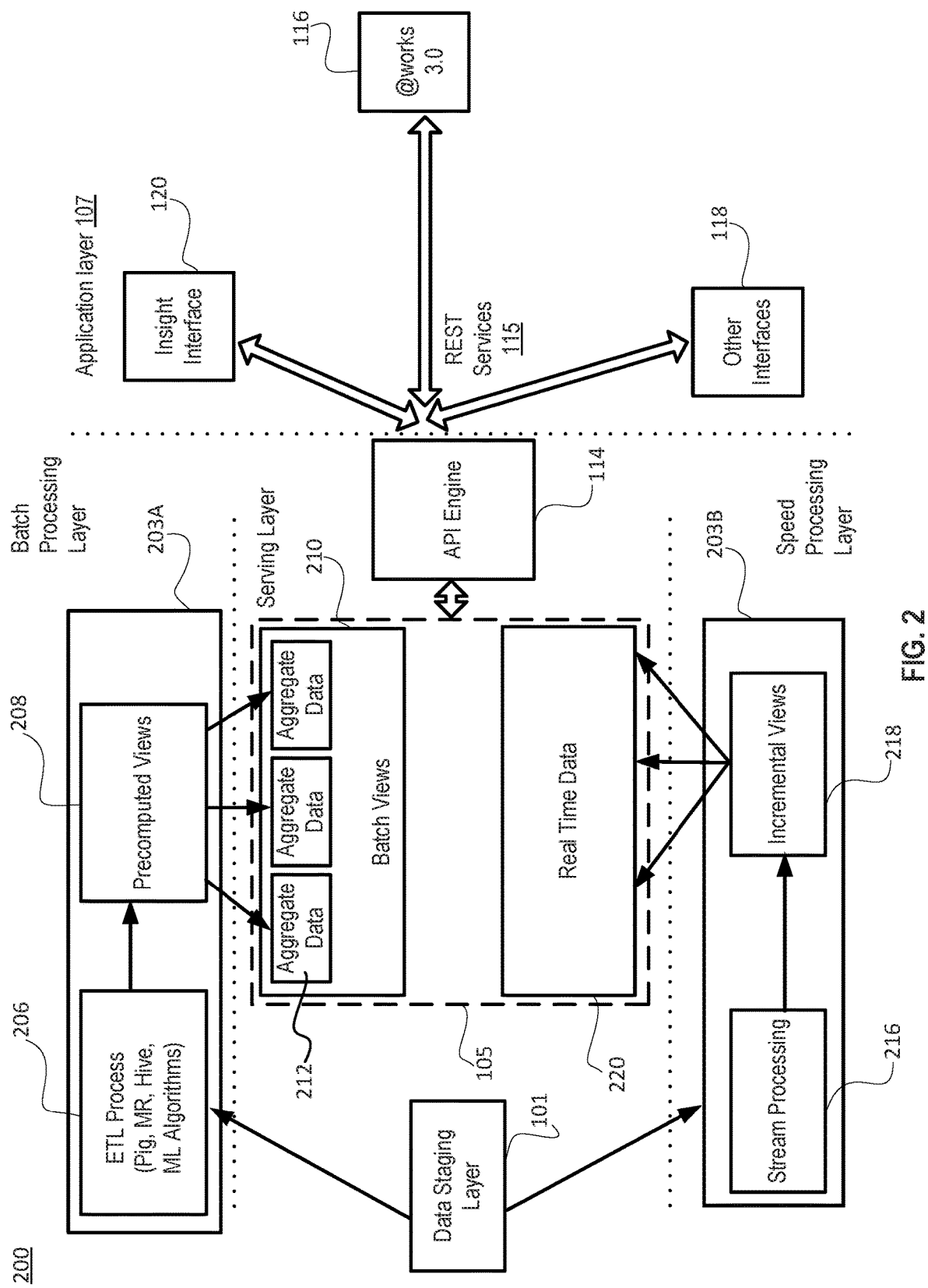
FIG. 2 illustrates a flow chart depicting data flow through a system for generating and delivering insights using big data infrastructure, in accordance with various embodiments.

Referring now to FIG. 2, an exemplary process flow 200 depicts the transmission, transformation, and delivery of insights generated using system 100 is shown, according to various embodiments. Data storage 102 of data staging layer 101 may be retrieved for processing by data processing layer 103. Data processing layer 103 may include a speed processing layer 203B and a batch processing layer 203A.

In various embodiments, batch processing layer 203A may receive data from data staging layer 101 in batches. The batches may be delivered over a LAN or WAN network at predetermined intervals and/or variable intervals. Data received from data staging layer 101 may be in various data formats such as, for example, Pig, Hive, MapReduce, machine teaming algorithms, SQL query results, or other data formats. Batch processing layer 203A data may process and/or transform into precomputed views 208 stored in application data layer 105 as sets of aggregate data 212 in batch views 210. The precomputed views may be stored in a readily accessible big data format such as elastic search tables 106 for efficiency. Batch processing layer 203A may enable efficient processing of big data sets, but may execute over longer periods of time than speed processing layer 203B.

In various embodiments, speed processing layer 203B may receive from data staging layer 101 a stream of data for stream processing 216. The stream of data may be requested in response to a request for real-time data by API engine 112 and/or may be pushed by data staging layer 101 in response to an update, deletion, or insertion of data. The stream of data may include incremental changes to existing data sets stored in data staging layer 101. The data stream may be generated in real-time with speed processing layer 203B processing each incremental change on receipt. Stream processing may result in incremental views stored as real-time data 220. Speed processing layer 203B and batch processing layer 203A may function either independently or in concert to generate data for application data layer 105. API engine 112 operating on an application server and/or web server may retrieve and or write data to application data layer in response to API requests received from REST services 115. REST services 115 may support the insight interface 120, the website interface 116, and other interfaces 118 of application layer 107.

Figure 3A:
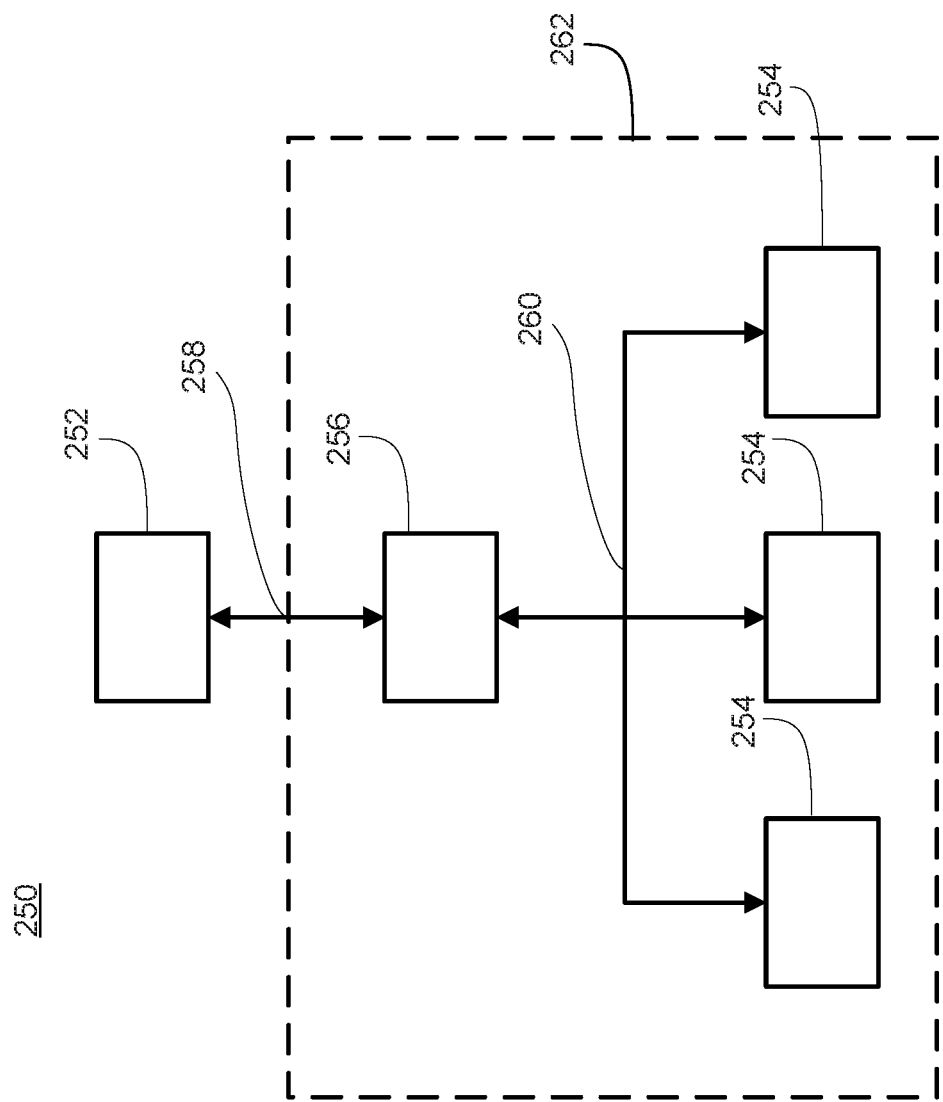
FIG. 3A illustrates an exemplary system for storing, reading, and writing big data sets, in accordance with various embodiments.

With reference to FIG. 3A, data storage 102 may be a distributed file system (DFS) 250 as shown, in accordance with various embodiments. DFS 250 comprises a distributed computing cluster 262 configured for parallel processing and storage. Distributed computing cluster 262 may comprise a plurality of nodes 254 in electronic communication with each of the other nodes, as well as a control node 256. Processing tasks may be split among the nodes of distributed computing cluster 262 to improve throughput and enhance storage capacity. Distributed computing cluster may be, for example, a Hadoop® cluster configured to process and store big data sets with some of nodes 254 comprising a distributed storage system and some of nodes 254 comprising a distributed processing system. In that regard, distributed computing cluster 262 may be configured to support a Hadoop® distributed file system (HDFS) as specified by the Apache Software Foundation at http://hadoop.apache.org/docs/.

In various embodiments, nodes 254, control node 256, and user device 252 may comprise any devices capable of receiving and/or processing an electronic message via network 258 and/or network 260. For example, nodes 254 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, user device 252 may submit requests to control node 256. Control node 256 may distribute the tasks among nodes 254 for processing to complete the job intelligently. Control node 256 may limit network traffic and enhance the speed at which incoming data is processed. In that regard, user device 252 may be a separate machine from distributed computing cluster 262 in electronic communication with distributed computing cluster 262 via network 258. Nodes 254 and control node 256 may similarly be in communication with one another over network 260. Network 260 may be an internal network isolated from the Internet and user device 252, or, network 260 may comprise an external connection to enable direct electronic communication with user device 252 and the Internet.

In various embodiments, DFS 250 may process hundreds of thousands of records from a single data source. DFS 250 may also ingest data from hundreds of data sources. Nodes 254 may process the data in parallel to expedite the processing. Furthermore, the transformation and intake of data as disclosed below may be carried out in memory on nodes 254. For example, in response to receiving a source data file of 100,000 records, a system with 100 nodes 254 may distribute the task of processing 1,000 records to each node 204. Each node 204 may process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 3B:
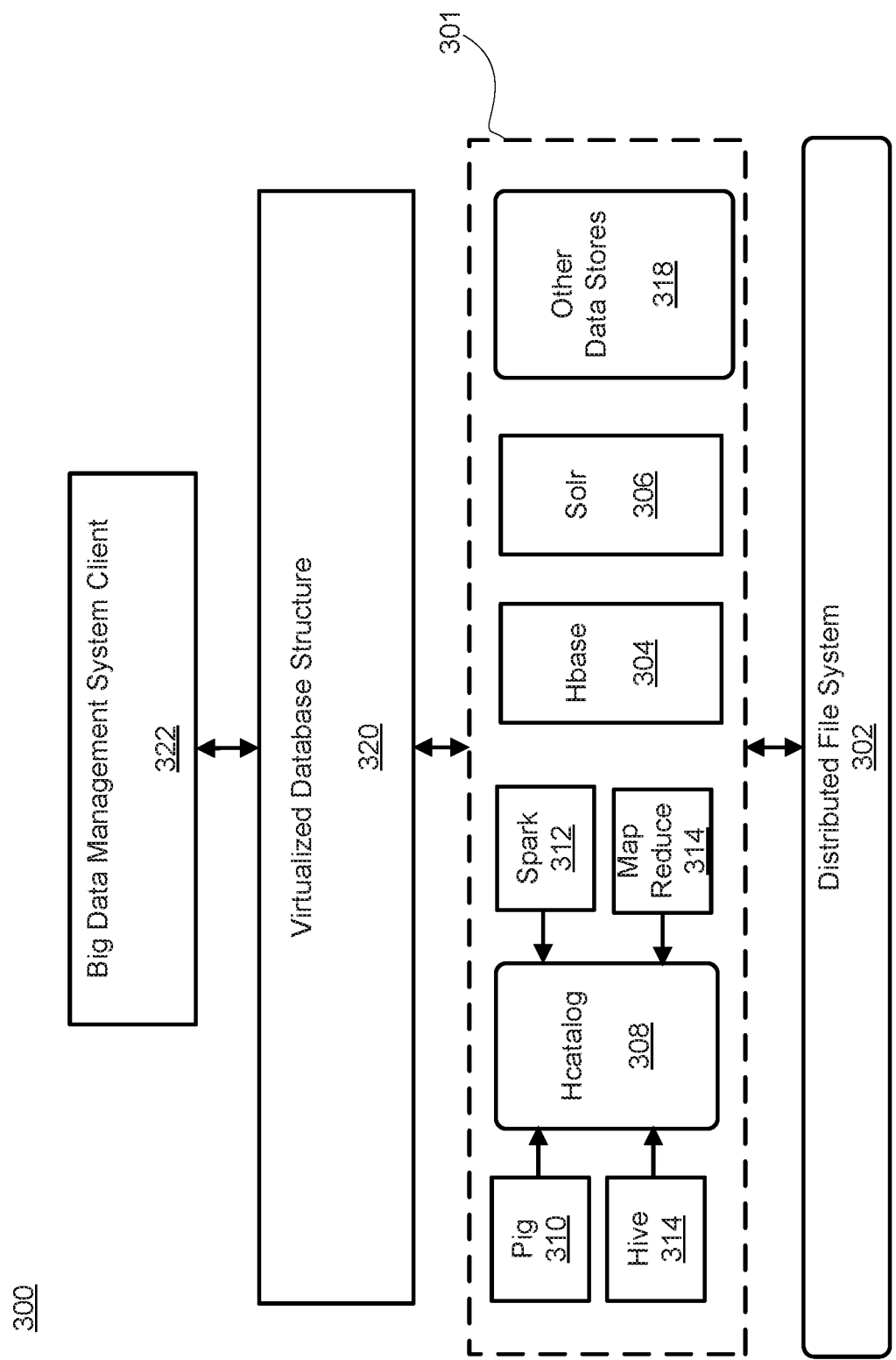
FIG. 3B illustrates an exemplary big data management system supporting a unified, virtualized interface for multiple data storage types, in accordance with various embodiments.

With reference to FIG. 3B, an exemplary architecture of a big data management system (BDMS) 300 is shown, in accordance with various embodiments. BDMS 300 may be similar to or identical to DFS 250 of FIG. 2, for example. DFS 302 may serve as the physical storage medium for the various data storage formats 301 of DFS 302. A non-relational database 304 may be maintained on DFS 302. For example, non-relational database 304 may comprise an HBase™ storage format that provides random, real time read and/or write access to data, as described and made available by the Apache Software Foundation at http://hbase,apache.org/.

In various embodiments, a search platform 306 may be maintained on DFS 302. Search platform 306 may provide distributed indexing and load balancing to support fast and reliable search results. For example, search platform 306 may comprise a Solr® search platform as described and made available by the Apache Software Foundation at http://lucene.apache.org/solr/.

In various embodiments, a data warehouse 314 such as Hive® may be maintained on DFS 302. The data warehouse 314 may support data summarization, query, and analysis of warehoused data. For example, data warehouse 314 may be a Hive® data warehouse built on Hadoop® infrastructure. A data analysis framework 310 may also be built on DFS 302 to provide data analysis tools on the distributed system. Data analysis framework 310 may include an analysis runtime environment and an interface syntax such similar to those offered in the Pig platform as described and made available by the Apache Software Foundation at https://pig.apache.org/.

In various embodiments, a cluster computing engine 312 for high-speed, large-scale data processing may also be built on DFS 302. For example, cluster computing engine 312 may comprise an Apache Spark™ computing framework running on DFS 302. DFS 302 may further support a MapReduce layer 316 for processing big data sets in a parallel, distributed manner to produce records for data storage formats 301. For example, MapReduce layer 316 may be a Hadoop® MapReduce framework distributed with the Hadoop® HDFS as specified by the Apache Software Foundation at http://hadop.apache.org/docs/. The cluster computing engine 312 and MapReduce layer 316 may ingest data for processing, transformation, and storage in data storage formats 301 using the distributed processing and storage capabilities of DFS 302.

In various embodiments, DFS 302 may also support a table and storage management layer 308 such as, for example, an HCatalog installation. Table and storage management layer 308 may provide an interface for reading and writing data for multiple related storage formats. Continuing the above example, an HCatalog installation may provide an interface for one or more of the interrelated technologies described above such as, for example, Hive®, Pig, Spark® and Hadoop® MapReduce.

In various embodiments, DFS 302 may also include various other data storage formats 318. Other data storage formats 318 may have various interface languages with varying syntax to read and/or write data. In fact, each of the above disclosed storage formats may vary in query syntax and interface techniques. Virtualized database structure 320 may provide a uniform, integrated user experience by offering users a single interface point for the various different data storage formats 301 maintained on DFS 302. Virtualized database structure 320 may be a software and/or hardware layer that makes the underlying data storage formats 301 transparent to client 322 by providing variables on request. Client 322 may request and access data by requesting variables from virtualized database structure 320. Virtualized database structure 320 may access the variables using the various interfaces of the various data storage formats 301 and return the variables to client 322.

In various embodiments, the data stored using various above disclosed data storage formats 301 may be stored across data storage formats 301 and accessed at a single point through virtualized database structure 320. The variables accessible through virtualized database structure 320 may be similar to a column in a table of a traditional RDBMS. That is, the variables identify data fields available in the various data storage formats 301.

In various embodiments, variables may be stored in a single one of the data storage formats 301 or replicated across numerous data storage formats 301 to support different access characteristics. Virtualized database structure 320 may comprise a catalog of the various variables available in the various data storage formats 301. The cataloged variables enable BDMS 300 to identify and locate variables stored across different data storage formats 301 on DFS 302. Variables may be stored in at least one storage format on DFS 302 and may be replicated to multiple storage formats on DFS 302. The catalog of virtualized database structure 320 may track the location of a variable available in multiple storage formats.

The variables may be cataloged as they are ingested and stored using data storage formats 301. The catalog may track the location of variables by identifying the storage format, the table, and/or the variable name for each variable available through virtualized database structure 320. The catalog may also include metadata describing what the variables are and where the variables came from such as data type, original source variables, timestamp, access restrictions, sensitivity of the data, and/or other descriptive metadata.

Metadata may be copied from the storage formats 301 or generated separately for virtualized database structure 320.

In various embodiments, virtualized database structure 320 may provide a single, unified, and virtualized data storage format that catalogues accessible variables and provides a single access point for records stored on data storage formats 301. Client 322 may access data stored in various data storage formats 301 via the virtualized database structure 320. In that regard, virtualized database structure 320 may be a single access point for data stored across the various data storage formats 301 on DFS 302.

In various embodiments, virtualized database structure 320 may store and maintain the catalog of variables including locations and descriptive metadata, but virtualized database structure 320 may not store the actual data contained in each variable. The data that fills the variables may be stored on DFS 302 using data storage formats 301. Virtualized database structure 320 may enable read and write access to the data stored in data storage formats 301 without a client system having knowledge of the underlying data storage formats 301. The augmented access to various data storage formats 301 may support real-time insights into the data contained in desperate storage formats.

Figure 4:
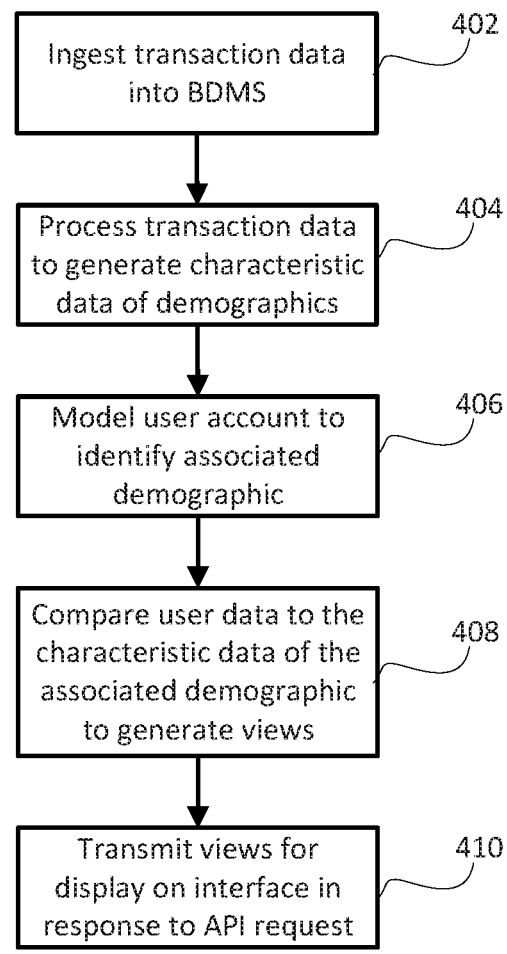
FIG. 4 illustrates an exemplary process for generating actionable insights, in accordance with various embodiments.

Referring now to FIG. 4, an exemplary process 400 for generating and consuming insights using system 100 is shown, according to various embodiments. System 100 may ingest transaction data into BDMS 300 (Block 402). Ingestion may occur as described above in response to updated data streams becoming available to BDMS 300 to prepare data in data staging layer 101 for processing. The system may process the transaction data to generate characteristic data associated with demographics (Block 404). For example, demographic data may include details around a company's revenue, industry, or geography. The demographic material may be generated by, for example, by summating all transactions for a demographic and dividing the result by the number of accounts in the demographic to generate an average transaction total for the demographic. Process 400 might compare, for example, companies with similar revenues.

Figure 9:
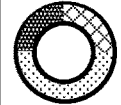
FIG. 9 illustrates an exemplary interface for viewing and acting on transactions flagged by big data infrastructure, in accordance with various embodiments.

In various embodiments, the demographics may be peer groups of like people and entities. System 100 may identify norms and capture the norms in the characteristic data for the demographic. Individual user accounts may be compared to their peer group by comparing the individual user account data to the characteristic data of the demographic. For example, system 100 may use the spend pattern of peers in the demographic to identify normal and/or abnormal spend patterns for a particular user account. Peer groups may be grouped by transaction history, job title, user defined groups, or other characteristics suitable for grouping. System 100 may identify out of pattern transactions in real-time, which may be listed in a structured interface 900 of FIG. 9 for viewing out of pattern transactions, for example. An administrator may flag the individual transactions as resolved or false positive, for example. The structured interface 900 may adjust the list to exclude the marked transactions in real-time. Out of pattern transactions may be identified, for example, based on value, merchant, or day. A company policy may also be set to determine boundaries for in policy spending.

In various embodiments, system 100 may model user account to match the user account to an associated demographic (Block 406). The user account may be modeled using any techniques available to match a user with appropriate demographic groups. Suitable modeling techniques may include, for example, nearest neighbor modeling and/or look-alike modeling.

Figure 5:
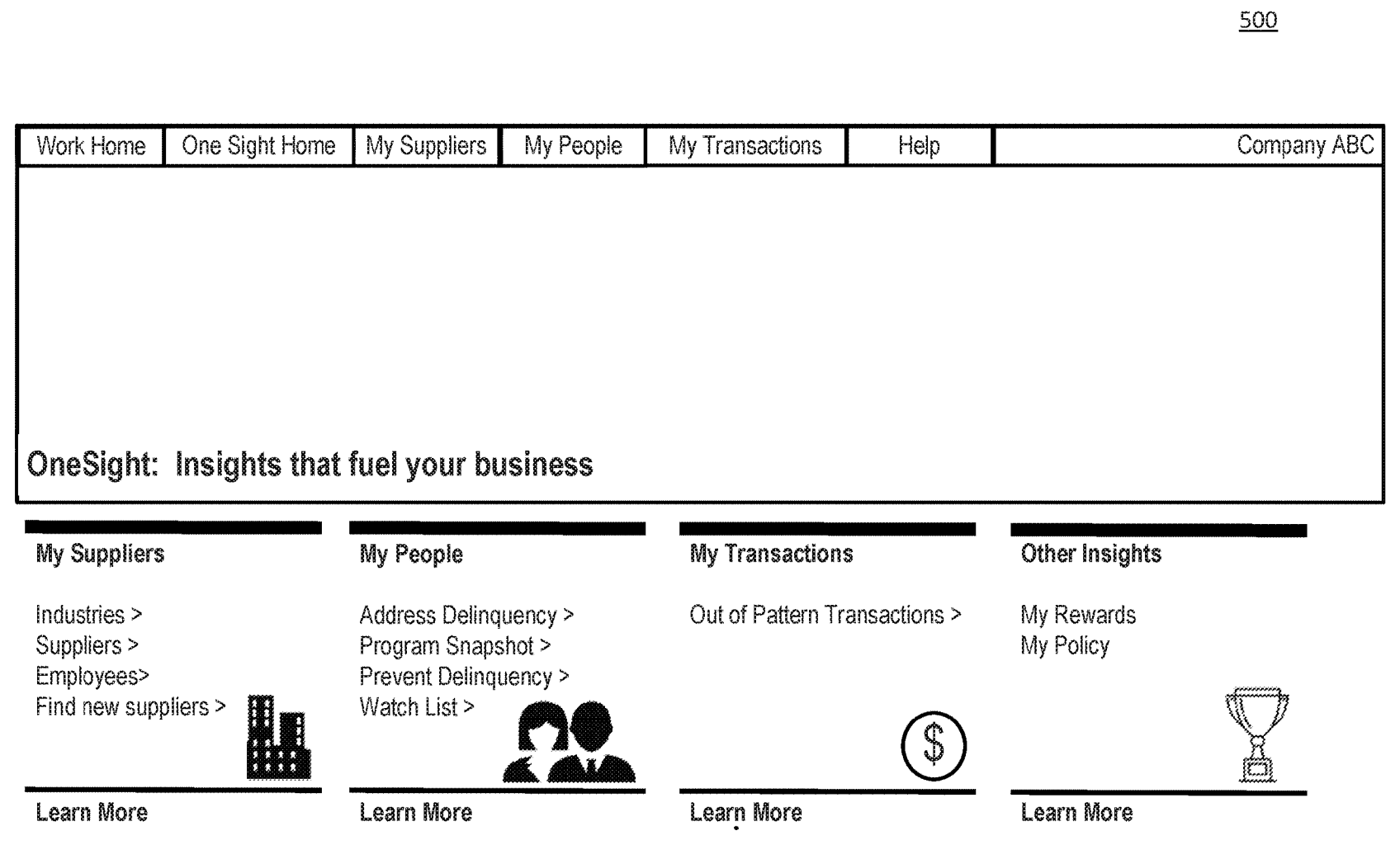
Figure 6:
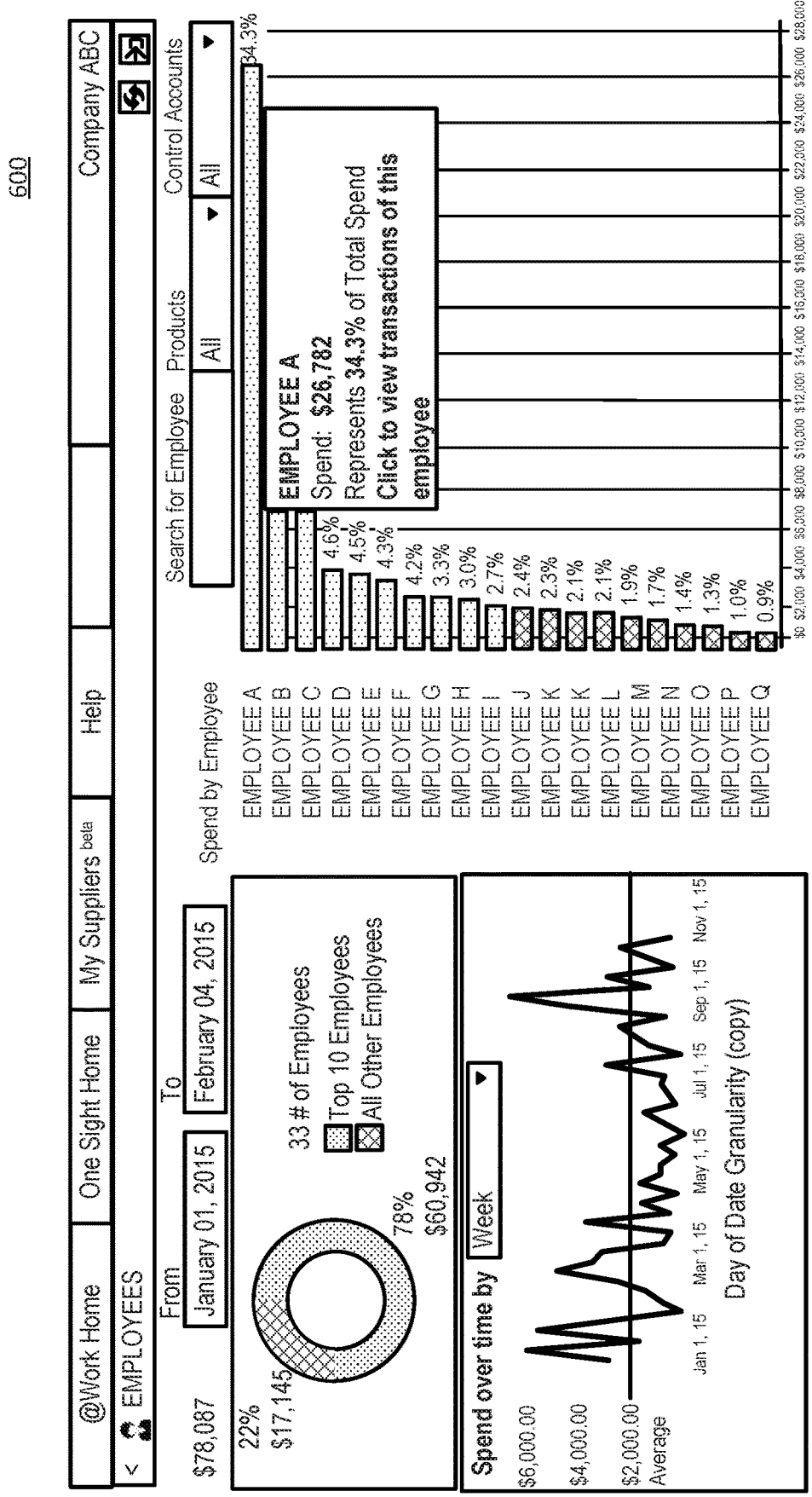
FIG. 6 illustrates a structured interface for viewing and acting on insights related to employee spending, in accordance with various embodiments.

In various embodiments, system 100 may compare user data to the characteristic data of the associated demographic to generate views (Block 408). Comparing user data with the characteristic data of the demographics may include enriching transaction information with merchant data. The views generated may include information which helps classify spend by various categories (e.g., merchant, merchant industry, merchant type, etc.). Views may represent historical delinquency information for the accounts associated with user data. Transactions may be run through an out-of-pattern algorithm and marked as out of pattern for display in views. The comparison may be executed in real-time in response to an API request. For example, a program administrator 126 may navigate from landing interface 500 of FIG. 5 to an employee interface 600 of FIG. 6. Employees interface 600 may list each individual having a transaction account associated with the corporate spending program overseen by program administrator 126. In response to navigation to interface 600, an API request may be generated to request the insights populating interface 600. For example, system 100 may compare the demographic of all employees of the company to individual employees of the company to determine what percentage of the company's spend is generated by each employee over a selectable time period. System 100 may also perform analytics based only on company-specific transaction data. For example, system 100 may graph the spend of the company over a predetermined time period such as a day, week, month, quarter, or year, for example. The employees interface may thus enable a program administrator 126 to filter by product, by control accounts, and to view employee transactions.

Figure 7:
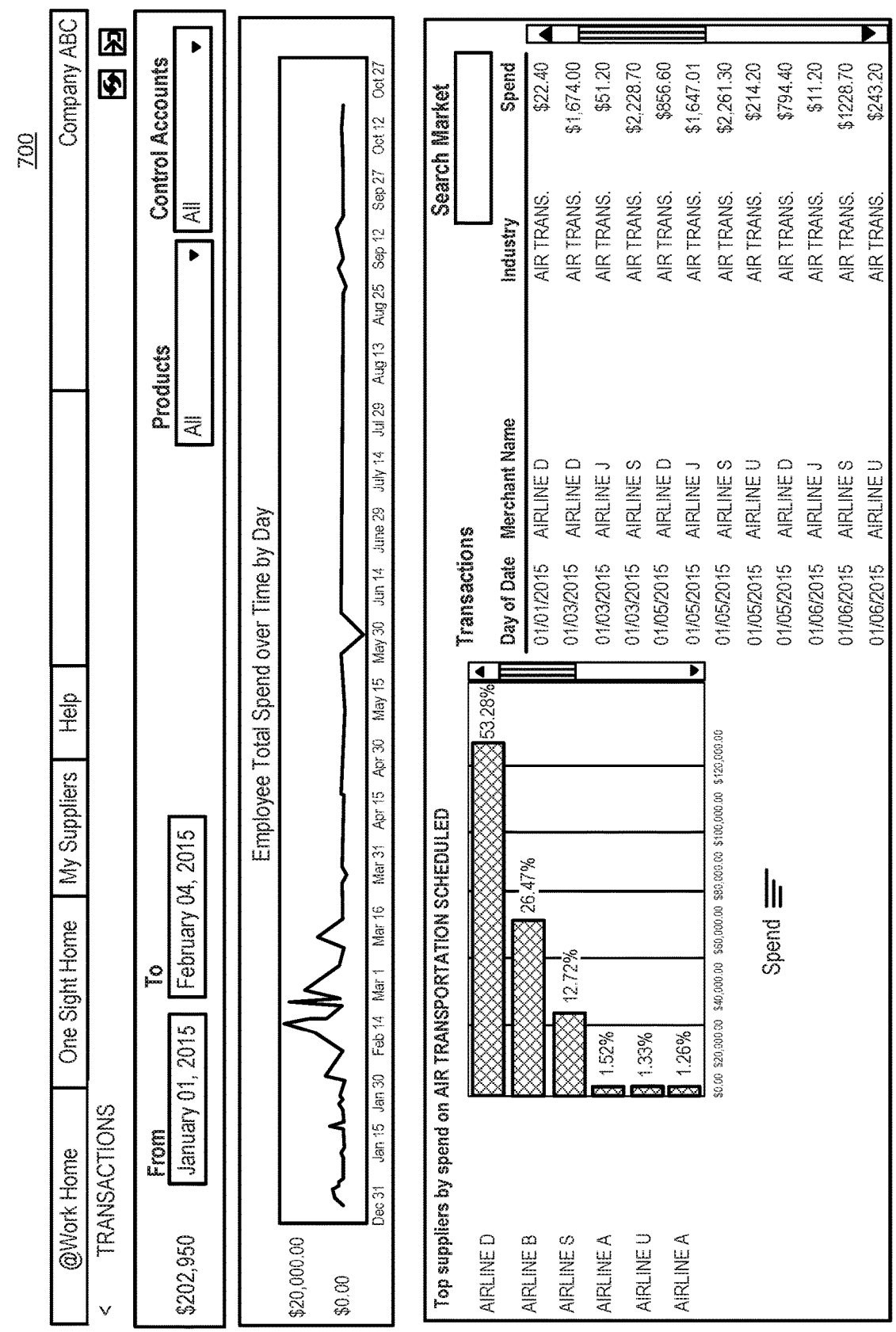
FIG. 7 illustrates a structured interface for viewing and acting on insights related to individual transactions, in accordance with various embodiments.

In another example, a program administrator 126 may navigate from landing interface 500 to suppliers interface 700 of FIG. 7. In response to navigation to interface 700, an API request may be generated to request the insights populating transaction interface 700. For example, system 100 may summate all transactions with individual merchants or suppliers from a segment of merchants (e.g., each airline from the segment of airlines) to generate data identifying the percentage of company spend in the segment allocated to each merchant over a selectable time period. The suppliers interface 600 may enable review of total spend within a period, selection of date ranges, distribution of total spend, spend over time, a bar, plot, scatter, table, or other graphical representation of spend, and review into each insight by drilling down further.

Figure 8:
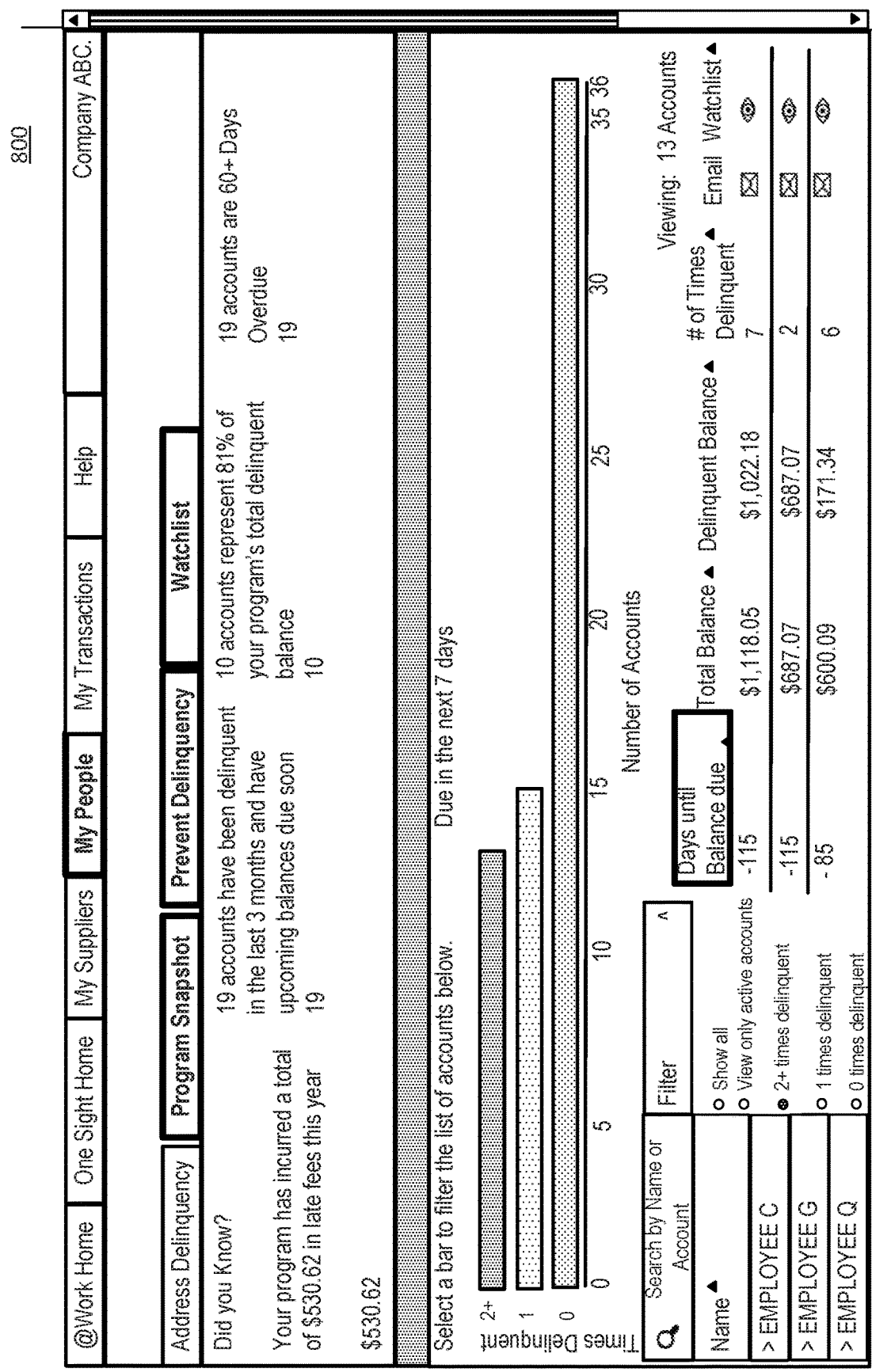
FIG. 8 illustrates a structured interface for viewing and acting on problems identified by the big data infrastructure, in accordance with various embodiments.

In another example, a program administrator 126 may navigate from landing interface 500 to a delinquency interface 800 of FIG. 8. In response to navigation to interface 800, an API request may be generated by an application server to request the insights populating transaction interface 800. For example, system 100 may select from application data layer 105 each account associated with the corporate ID for the corporate entity of program administrator 126 and identify all delinquent accounts. System 100 may also generate other insights and views associated with the delinquent accounts such as fees accrued as a result of delinquency, number of delinquent accounts, the times each account has been delinquent. The insights may be actionable by the program administrator 126, for example, by triggering an email or adding a delinquent account to a watch list. Delinquency interface 800 may thus enable a program administrator to view program-wide delinquency statistics, accounts due within a week, account details, to filter the list of accounts, to email an account holder, and to add the account to a watch list.

Although several exemplary interfaces and insights are provided above, access to various interfaces may be added and removed in a modular manner from program administrator to provide flexible configuration. Thus, system 100 is expandable to support additional insights and actions by program administrator 126. For example, a rewards interface may be added to a corporate ID to make recommendations and to classify and match transactions to purchases. Continuing the above example, delinquency interface 800 or any other interface may also be removed from a corporate ID. In that regard, the experience for each corporate ID may be customized based on the preferences of the corresponding program administrator 126.

In various embodiments, system 100 may facilitate transmission of the views for display on various interfaces in response to the API request (Block 410). An application server may transmit data responsive to the API request to a computing device for consumption by program administrator 126. The data responsive to the API request may be, for example, a JSON response containing the data of the computed views for display.

Systems and methods of the present disclosure may thus provide a suite of insights tools to help businesses save time and money by managing their corporate spending. Closed-loop data available to a transaction account entity may be combined with data from external sources and run through big data analytics to drive an interface.

For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety for all purposes.

The disclosure and claims do not describe only a particular outcome of generating insights using big data, but the disclosure and claims include specific rules for implementing the outcome of generating insights using big data and that render information into a specific format that is then used and applied to create the desired results of generating insights using big data, as set forth in *McRO, Inc. v. Bandai Namco Games America Inc.* (Fed. Cir. case number 15-1080, Sep. 13, 2016). In other words, the outcome of generating insights using big data can be performed by many different types of rules and combinations of rules, and this disclosure includes various embodiments with specific rules. While the absence of complete preemption may not guarantee that a claim is eligible, the disclosure does not sufficiently preempt the field of generating insights using big data at all. The disclosure acts to narrow, confine, and otherwise tie down the disclosure so as not to cover the general abstract idea of just generating insights using big data. Significantly, other systems and methods exist for generating insights using big data, so it would be inappropriate to assert that the claimed invention preempts the field or monopolizes the basic tools of generating insights using big data. In other words, the disclosure will not prevent others from generating insights using big data, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a program manager when their computer is offline. The system may include generating customized information and alerting a remote program manager that the information can be accessed from their computer. The alerts are generated by filtering received information, building information alerts and formatting the alerts into data blocks based upon program manager preference information. The data blocks are transmitted to the program manager's wireless device which, when connected to the computer, causes the computer to auto-launch an application to display the information alert and provide access to more detailed information about the information alert. More particularly, the method may comprise providing a viewer application to a program manager for installation on the remote program manager computer; receiving information at a transmission server sent from a data source over the Internet, the transmission server comprising a microprocessor and a memory that stores the remote program manager's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a program manager based upon the destination address and transmission schedule, wherein the alert activates the application to cause the information alert to display on the remote program manager computer and to enable connection via the URL to the data source over the Internet when the wireless device is locally connected to the remote program manager computer and the remote program manager computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying, all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A ROC may comprise any transaction or transaction data. The ROC may be a unique identifier associated with a transaction. ROC data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCS and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS),etc.). In various embodiments, the server may include web servers (e.g. APACHE, IIS, GWS, SUN JAVA® SYSTEM WEB SERVER).

A web client includes any device e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp. and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, key board, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Tony, HTTP. The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing. Whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-

145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, andlor the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as JSON, XML, SOAP, AJAX, WSDL, and UDDI. Web services methods are well known in the art, and are covered in many standard texts. See, e.g., Alex Nghiem, IT Web Services: A Roadmap for the Enterprise (2003), hereby incorporated by reference. For example, representational state transfer (REST), or RESTful, web services may provide one way of enabling interoperability between applications.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

In various embodiments, the software elements of the system may also be implemented using Node.js®. Nodejs® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuipen to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

processing, by a data processing layer of a distributed computing cluster of a credit issuer data management system, transaction data stored in a data staging layer of the credit issuer data management system to generate characteristic data associated with individual ones of a plurality of demographics of a plurality of individual corporate transaction accounts associated with a plurality of corporate IDs of a plurality of corporate entities, wherein the characteristic data specifies a normalized value of transaction data for a particular demographic of the plurality of individual corporate transaction accounts across the plurality of corporate IDs, wherein a respective corporate ID corresponds to a particular corporate entity;

modeling, by the data processing layer of the distributed computing cluster, a corporate transaction account associated with the respective corporate ID and identifying a demographic associated with the corporate transaction account from the plurality of demographics of the plurality of individual corporate transaction accounts associated with the plurality of corporate IDs;

receiving a query request, via the data processing layer at a single centralized access point of the distributed computing cluster, to access a view of a comparison of user data associated with an individual corporate transaction account of an individual corporate entity and the characteristic data of the demographic associated with the plurality of corporate IDs, wherein the view is stored in a data storage format suitable for real time processing at an application data layer of the distributed computing cluster, wherein the user data comprises spend data attributed to a user of the individual corporate entity and the characteristic data comprise spend data attributed to the demographic associated with the plurality of corporate IDs;

looking up, by the data processing layer of the distributed computing cluster, a first variable and a second variable in a virtualized database catalog of the application data layer using the query request, wherein the first variable corresponds to the user data associated with the individual corporate transaction account of the individual corporate entity and the second variable corresponds to the characteristic data of the demographic associated with the plurality of corporate IDs;

comparing, by the data processing layer of the distributed computing cluster, the user data associated with the individual corporate transaction account of the individual corporate entity to the characteristic data of the demographic associated with the plurality of corporate IDs;

generating, by the data processing layer of the distributed computing cluster, the view of a comparison of the user data associated with an individual corporate transaction account of the individual corporate entity and the characteristic data of the demographic associated with the plurality of corporate IDs; and transmitting, from the application data layer of the distributed computing cluster, the view for display on a graphical interface in response to the query request.

2. The method of claim 1, further comprising storing, by the distributed computing cluster, the user data associated with the respective corporate ID of the individual corporate entity in a partition of the distributed computing cluster.

3. The method of claim 1, further comprising identifying, by the distributed computing cluster, a transaction as an out-of-pattern transaction in response to the comparing the user data associated with the respective corporate ID of the individual corporate entity to the characteristic data of the demographic associated with the plurality of corporate IDs.

4. The method of claim 1, further comprising further comprising storing, by the distributed computing cluster, the view in the data storage format.

5. The method of claim 1, wherein the graphical interface comprises an employees interface that enables a review of employee transactions.

6. The method of claim 1, wherein the graphical interface comprises a suppliers interface that enables a review of spend data associated with individual suppliers and total spend data over time for a plurality of suppliers.

7. The method of claim 1, wherein the graphical interface comprises a delinquency interface that enables a review of delinquency statistics across corporate transaction accounts.

8. The method of claim 1, wherein the virtualized database catalog stores a location of a data field corresponding to the first variable in a first data table and a location of a data field corresponding to the second variable in a second data table, wherein a storage format of the first data table is different than the storage format of the second data table.

9. The method of claim 1, further comprising:

receiving, by the data processing layer of the distributed computing cluster, a data stream from the data staging layer of the credit issuer data management system;

processing, by the data processing layer of the distributed computing cluster, the data stream from the credit issuer data management system to update the view in real time;

flagging, by the data processing layer of distributed computing cluster, an out-of-pattern transaction as a false positive in response to a selection in the graphical interface displaying the view; and updating, by the data processing layer of the distributed computing center, the view in real time to exclude a flagged transaction.

10. A data-based system, comprising:

a processor:

a tangible, non-transitory memory configured to communicate with the processor, the tangible, non-transitory memory having instructions stored thereon that, in response to execution by the processor, cause a distributed computing cluster to perform operations comprising:

processing, by a data processing layer of the distributed computing cluster of a credit issuer data management system, transaction data of a credit issuer stored in a data staging layer of the credit issuer data management system to generate characteristic data associated with individual ones of a plurality of demographics of a plurality of individual corporate transaction accounts associated with a plurality of corporate IDs of a plurality of corporate entities, wherein the characteristic data specifies a normalized value of transaction data of the credit issuer for a particular demographic of the plurality of individual corporate transaction accounts across the plurality of corporate IDs, wherein a respective corporate ID corresponds to a particular corporate entity;

modeling, by the data processing layer of the distributed computing cluster, a corporate transaction account associated with the respective corporate ID and identifying a demographic associated with the corporate transaction account from the plurality of demographics of the plurality of individual corporate transaction accounts associated with the plurality of corporate IDs;

receiving a query request, via the data processing layer at a single centralized access point of the distributed computing cluster, to access a view of a comparison of user data associated with an individual corporate transaction account of an individual corporate entity and the characteristic data of the demographic associated with the plurality of corporate IDs, wherein the view is stored in a data storage format suitable for real time processing at an application data layer of the distributed computing cluster, wherein the user data comprises spend data attributed to a user of the individual corporate entity and the characteristic data comprise spend data attributed to the demographic associated with the plurality of corporate IDs;

looking up, by the data processing layer of the distributed computing cluster, a first variable and a second variable in a virtualized database catalog of the application data layer using the query request, wherein the first variable corresponds to the user data associated with the individual corporate transaction account of the individual corporate entity and the second variable corresponds to the characteristic data of the demographic associated with the plurality of corporate IDs;

comparing, by the data processing layer of the distributed computing cluster, the user data associated with the individual corporate transaction account of the individual corporate entity to the characteristic data of the demographic associated with the plurality of corporate IDs;

generating, by the data processing layer of the distributed computing cluster, the view of a comparison of the user data associated with an individual corporate transaction account of the individual corporate entity and the characteristic data of the demographic associated with the plurality of corporate IDs; and transmitting, from the application data layer of the distributed computing cluster, the view for display in a graphical interface in response to the query request.

11. The system of claim 10, wherein the operations further comprise storing, by the distributed computing cluster, the user data associated with the respective corporate ID of the individual corporate entity in a partition of the distributed computing cluster.

12. The system of claim 10, wherein the operations further comprise identifying, by the distributed computing cluster, a transaction as an out-of-pattern transaction in response to the comparing the user data associated with the respective corporate ID of the individual corporate entity to the characteristic data of the demographic associated with the plurality of corporate IDs.

13. The system of claim 10, wherein the operations further comprise storing, by the distributed computing cluster, the view in the data storage format.

14. The system of claim 10, wherein the graphical interface comprises an employees interface that enables a review of employee transactions.

15. The system of claim 10, wherein the graphical interface comprises a suppliers interface that enables a review of spend data associated with individual suppliers and total spend data over time for a plurality of suppliers.

16. The system of claim 10, wherein the virtualized database catalog stores a location of a data field corresponding to the first variable in a first data table and a location of a data field corresponding to the second variable in a second data table, wherein a storage format of the first data table is different than the storage format of the second data table.

17. The system of claim 10, wherein the operations further comprise
- receiving, by the data processing layer of the distributed computing cluster, a data stream from the data staging layer of the credit issuer data management system;
- processing, by the data processing layer of the distributed computing cluster, the data stream from the credit issuer data management system to update the view in real time;
- flagging, by the data processing layer of distributed computing cluster, an out-of-pattern transaction as a false positive in response to a selection in the graphical interface displaying the view; and
- updating, by the data processing layer of the distributed computing cluster, the view in real time to exclude a flagged transaction.

18. An article of manufacture including a non-transitory, tangible computer readable storage medium having instructions stored thereon that in response to execution by a distributed computing cluster, cause the distributed computing cluster to perform operations comprising:
- processing, by a data processing layer of the distributed computing cluster of a credit issuer data management system, transaction data stored in a data staging layer of the credit issuer data management system to generate characteristic data associated with individual ones of a plurality of demographics of a plurality of individual corporate transaction accounts associated with a plurality of corporate IDs of a plurality of corporate entities, wherein the characteristic data specifies a normalized value of transaction data for a particular demographic of the plurality of individual corporate transaction accounts across the plurality of corporate IDs, wherein a respective corporate ID corresponds to a particular corporate entity;
- modeling, by the data processing layer of the distributed computing cluster, a corporate transaction account associated with the respective corporate ID and identifying a demographic associated with the corporate transaction account from the plurality of demographics of the plurality of individual corporate transaction accounts associated with the plurality of corporate IDs;
- receiving a query request, via the data processing layer at a single centralized access point of the distributed computing cluster, to access a view of a comparison of user data associated with an individual corporate transaction account of an individual corporate entity and the characteristic data of the demographic associated with the plurality of corporate IDs, wherein the view is stored in a data storage format suitable for real time processing at an application data layer of the distributed computing cluster, wherein the user data comprises spend data attributed to a user of the individual corporate entity and the characteristic data comprise spend data attributed to the demographic associated with the plurality of corporate IDs;
- looking up, by the data processing layer of the distributed computing cluster, a first variable and a second variable in a virtualized database catalog of the application data layer using the query request, wherein the first variable corresponds to the user data associated with the individual corporate transaction account of the individual corporate entity and the second variable corresponds to the characteristic data of the demographic associated with the plurality of corporate IDs;
- comparing, by the data processing layer of the distributed computing cluster, the user data associated with the individual corporate transaction account of the individual corporate entity to the characteristic data of the demographic associated with the plurality of corporate IDs;
- generating, by the data processing layer of the distributed computing cluster, the view of a comparison of the user data associated with an individual corporate transaction account of the individual corporate entity and the characteristic data of the demographic associated with the plurality of corporate IDs; and
- transmitting, from the application data layer of the distributed computing cluster, the view for display in a graphical interface in response to the query request.

19. The article of claim 18, wherein the operations further comprise storing, by the distributed computing cluster, the user data associated with the respective corporate ID of the individual corporate entity in a partition of the distributed computing cluster.

20. The article of claim 18, wherein the operations further comprise identifying, by the distributed computing cluster, a transaction as an out-of-pattern transaction in response to the comparing the user data associated with the respective corporate ID of the individual corporate entity to the characteristic data of the demographic associated with the plurality of corporate IDs.

* * * * *